(12) United States Patent
Wilkey

(10) Patent No.: US 11,001,325 B2
(45) Date of Patent: May 11, 2021

(54) BIKE BAG KIT

(71) Applicant: Brandon John Wilkey, South Jordan, UT (US)

(72) Inventor: Brandon John Wilkey, South Jordan, UT (US)

( * ) Notice: Subject to any disclaimer, the term of this patent is extended or adjusted under 35 U.S.C. 154(b) by 0 days.

(21) Appl. No.: 16/414,138

(22) Filed: May 16, 2019

(65) Prior Publication Data
US 2020/0361555 A1 Nov. 19, 2020

(51) Int. Cl.
*B62J 9/26* (2020.01)
*B62J 9/40* (2020.01)

(52) U.S. Cl.
CPC .. *B62J 9/26* (2020.02); *B62J 9/40* (2020.02)

(58) Field of Classification Search
CPC .... B62J 9/26; A45F 3/005; A45F 4/02; A45C 1/04; A45C 13/02
USPC ................. 224/427, 428, 463, 237
See application file for complete search history.

(56) References Cited

U.S. PATENT DOCUMENTS

| | | | |
|---|---|---|---|
| 4,029,243 A * | 6/1977 | Zerobnick | A45F 3/00 224/681 |
| 4,059,207 A * | 11/1977 | Jackson | A45F 3/50 224/413 |
| 4,204,565 A * | 5/1980 | Nohmura | A01F 25/14 206/204 |
| 4,325,469 A | 4/1982 | Gurian | |
| 4,515,300 A | 5/1985 | Cohen | |
| 4,545,414 A * | 10/1985 | Baum | A45C 1/04 150/107 |
| 4,580,706 A * | 4/1986 | Jackson | B62J 9/00 224/417 |
| 4,862,519 A | 9/1989 | Bull | |
| 5,127,563 A * | 7/1992 | Chan | B62J 9/26 224/438 |
| 5,205,448 A | 4/1993 | Kester et al. | |
| D336,740 S | 6/1993 | Graf | |
| 5,228,609 A | 7/1993 | Gregory | |
| 5,245,517 A * | 9/1993 | Fenton | B62J 6/20 362/156 |
| 5,487,498 A | 1/1996 | Gleason | |
| 5,505,355 A | 4/1996 | Williams | |
| 5,887,770 A | 3/1999 | Covell | |
| 6,179,025 B1 * | 1/2001 | Sutton | A45C 3/08 150/105 |
| 6,237,776 B1 * | 5/2001 | Mogil | A45C 3/00 150/106 |
| 6,345,751 B1 | 2/2002 | Elliot | |
| 6,595,687 B2 * | 7/2003 | Godshaw | A01K 97/06 206/315.11 |

(Continued)

*Primary Examiner* — Adam J Waggenspack
(74) *Attorney, Agent, or Firm* — Jason P. Webb; Pearson Butler

(57) ABSTRACT

There is a bike bag kit, comprising a bike bag, a fanny pack, and a tool/utility bag. The bike bag is selectably coupleable to a bike under a bike seat. The bike bag includes a selectably closable mouth functionally coupled to a storage cavity. The fanny pack has unpadded front and rear panels. The fanny pack shaped and sized to fit through the mouth and fully within the storage cavity of the bike bag. The fanny pack includes a padded pocket disposed therein. The padded pocket has a first padded wall and a second padded wall, each wall being at least twice as thick as each of the front and rear panels of the fanny pack.

12 Claims, 9 Drawing Sheets

(56) References Cited

U.S. PATENT DOCUMENTS

| | | | |
|---|---|---|---|
| 6,889,882 B1 | 5/2005 | Leep | |
| 6,971,562 B2 | 12/2005 | Willows et al. | |
| 7,011,212 B2 * | 3/2006 | Thomson | B25H 3/00 |
| | | | 206/349 |
| 8,267,130 B1 * | 9/2012 | Sinnett | A45C 13/02 |
| | | | 150/112 |
| 8,985,409 B2 * | 3/2015 | Willows | A45F 3/14 |
| | | | 224/148.4 |
| 2004/0031834 A1 * | 2/2004 | Barr | B62J 9/21 |
| | | | 224/420 |
| 2005/0242140 A1 * | 11/2005 | Yong | B62J 7/08 |
| | | | 224/421 |
| 2006/0218690 A1 | 10/2006 | James | |
| 2009/0039127 A1 | 2/2009 | Dacko | |
| 2009/0205096 A1 | 8/2009 | Seemann | |
| 2013/0207423 A1 | 8/2013 | Russell et al. | |

* cited by examiner

BIKE BAG KIT

BACKGROUND OF THE INVENTION

Cross-Reference to Related Applications

None.

FIELD OF THE INVENTION

The present invention relates to bike accessories, specifically to bike bags and associated kits.

DESCRIPTION OF THE RELATED ART

In the related art, it has been known to use bike accessories, such as bike bags, to contain items while traveling on a bike. Interest in recreational and/or competitive cycling continues to increase. The consequence of this popularity of bicycle riding has been a growing presence of bicycle operators or riders or cyclists, of all ages, on public roads or off-road trails. Further, as the recreation has grown, typical bicycle excursions or trips have lengthened in extent and, concomitantly a great variety of lighter, multi-geared and faster bicycles have entered the marketplace. Increasingly, as bicycle trips are planned for longer durations and distances, rider commonly prefer to carry several accessories with them during such excursions. Many riders wear clothing that does not include pockets or other containers for carrying such items. Even when wearing clothes with pockets, operating a bicycle with such articles disposed in a pocket can be both a nuisance and/or painful. Accordingly, many riders prefer an accessory carrying device that can be supported by the bicycle rather than carried on the rider. One such device is a seat pack.

A seat pack is a container constructed to be suspended or otherwise supported by the seat of the bicycle. Positioning the accessory container near the seat of the bicycle ensures that a rider can access the accessories even during operation of the bicycle. Some seat packs are constructed to be permanently secured to a particular bicycle whereas others are constructed to be removably secured thereto. Those seat pack that are constructed to be removably secured to a bicycle generally include a mating structure wherein one part is permanently secured to a particular bicycle and a pack part removably engages the mating structure.

Many seat packs are provided as a two-part system, the pack itself and a support bracket. The bracket is mechanically fixed to a seat and the pack removably engages the bracket. Such systems generally require a bracket that is specific to a seat construction and the use of multiple mechanical connectors to secure the bracket to a respective seat.

Although such systems provide a removable pack, use of the pack is limited to the bicycle having the bracket attached thereto. Alternatively, the rider must transport the tools necessary in order to transfer the bracket from one bicycle to another. Furthermore, loss, theft, or damage to either of the pack or the bracket renders the other part of the system virtually useless.

Such systems also have a relatively complex construction of the connection mechanism configure to allow the removable engagement of the seat pack with the underlying bracket. Commonly, a snap fit connection or otherwise movable members are provided that interact to secure the pack to the bracket. Such systems generally include deformable tabs and/or spring biased members that are constructed to cooperate with mating structures formed on the alternate member of the system. Such configurations complicate the construction of the seat pack system and are also suspect to failure. Generally, if any portion of the interface structure between the pack and the bracket becomes damaged and/or worn, the seat pack system is rendered unreliable and or unusable.

The riding environment can also impact the life cycle of the seat pack system.

Riders who venture from paved surfaces are commonly subjected to more jarring or impact forces than riders who remain on paved surfaces. These forces are translated to the bicycle and any of the accessories and/or accessory mounting systems secured thereto. An accessory containing system such as a seat pack should be constructed to withstand such operating conditions. Furthermore, the means of connecting a seat pack to the bicycle must also be able to withstand the forces associated with extended rides over rough terrain so as to avoid the seat pack from becoming unintentionally detached from the seat.

Some improvements have been made in the field. Examples of references related to the present invention are described below in their own words, and the supporting teachings of each reference are incorporated by reference herein:

U.S. Pat. No. 4,515,300, issued to Cohen, discloses a multiple-use sports bag and method of converting it to a backpack. A multiple-use sports bag may be easily convertible to one of four separate bags: a bike bag, a shoulder bag, a belt bag, and, in particular, a backpack. The multiple-use sports bag comprises a pouch-like body having a first open storage space and a space adjacent thereto, a backpack folded up inside the adjacent space, Velcro strips for securing the backpack inside the body, a first zipper for providing access to the backpack, and pull tabs on opposite sides of the zipper for opening and closing the pouch. In a second embodiment, a second zipper is arranged parallel to the first zipper and extends almost completely around three contiguous walls of the pouch-like body. This second zipper provides access to a second open storage space on another side of the pouch-like body and allows the pouch-like body to open and close a suitcase-like man.

U.S. Pat. No. 5,505,355, issued to Williams, discloses a pack for carrying a gun. A hand gun is completely concealed within a gun carrying pack. The pack is mounted on a wearer by a belt around the wearer's waist. The pack has a pouch, concealed behind an additional belt strap and clip, for carrying a hand gun. The pouch a has front and rear walls. The front wall is permanently attached to the rear wall at the bottom and on one side, but releasably attached by two zippers located on a zipper track at the top and on the other side. The pouch completely seals a hand gun carried within the pouch. The additional belt strap and clip are connected across the zipper track at the top corner between the releasably attached top and side. By unclipping the additional belt strap and clip, a wearer can pull open the zippers to open the pouch and access the hand gun carried within.

U.S. Pat. No. 5,887,770, issued to Covell, discloses a convertible waist pack, day backpack and shoulder bag. A multiple use pack is designed for convenience, security and optimal use of space and structures which can be used as a waist pack, a day backpack or a shoulder bag. A back face of the waist pack slides by means of a long belt loop on a removable, adjustable belt with quick release buckles allowing the waist pack to serve as a fanny pack/belly pack. The waist pack converts into a day backpack by opening a zippered main compartment posterior to the waist pack's main storage compartment. The zipper is stopped by a strip of fabric located in the middle bottom of the waist pack's main storage compartment connected to the middle bottom of the back face of the waist pack. The connecting fabric strip becomes a combined zipper stop and weight-bearing hinge which keeps the zipper slider from being pulled apart by the weight of items stored in the pack when used in the day backpack mode. Most importantly the fabric strip becomes a hinge which allows the back face of the waist pack to become the bottom of the day backpack and the waist pack main storage compartment to become an anterior storage compartment for the day backpack.

The inventions heretofore known suffer from a number of disadvantages which include: not being lightweight, not increasing the visibility of the wearer or rider, not being more visible, not reducing wear and tear on contents, being distracting, not being water resistant, not being quiet, not protecting the contents, not being organized, not being durable, not being safe, and not being convenient.

What is needed is a bike bag kit that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available bike bag kits. Accordingly, the present invention has been developed to provide a bike bag kit that selectably couples to a bicycle.

There may be a bike bag kit, that may comprise a bike bag selectably coupleable to a bike under a bike seat. The bike bag may include a selectably closable mouth functionally coupled to a storage cavity. The bike bag kit may also comprise a fanny pack that may have unpadded front and/or rear panels. The fanny pack may be shaped and/or sized to fit through the mouth and/or fully within the storage cavity of the bike bag. The fanny pack may include a padded pocket that may be disposed therein. The padded pocket may have a first padded wall and/or a second padded wall. Each wall may be at least twice as thick as each of the front and/or rear panels of the fanny pack.

The kit may further include a utility bag. The utility bag may include one and/or more tools. The utility bag may be shaped and/or sized to fit through the mouth and/or fully within the storage cavity of the bike bag together with the fanny pack. The utility bag may include a wrench, a spare tire, a flat repair kit, and/or a pressurized gas cartridge. The utility bag, the bike bag, and/or the fanny pack may each include reflective material disposed on the outside thereof. Each of the utility bag, the bike bag, and/or the fanny pack may include water-resistant closure devices.

The mouth of the bike bag may include a flap-style closure system. The flap-style closure system may include a pair of inner flaps and/or a pair of outer flaps. The pair of inner flaps and/or the pair of outer flaps may fold inwards to close the mouth. The flap-style closure system may include a closure mechanism that may selectably keep the inner and/or outer flaps folded inward.

The mouth of the bike bag may include a water-resistant zipper closure that may close the mouth of the bike bag. A body of the bike bag may include a U-shaped insert that may bias the storage cavity of the bike bag open when the storage cavity of the bike bag is empty. The bike bag may include a cinch mechanism that may be disposed along a side thereof.

Reference throughout this specification to features, advantages, or similar language does not imply that all the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention.

Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
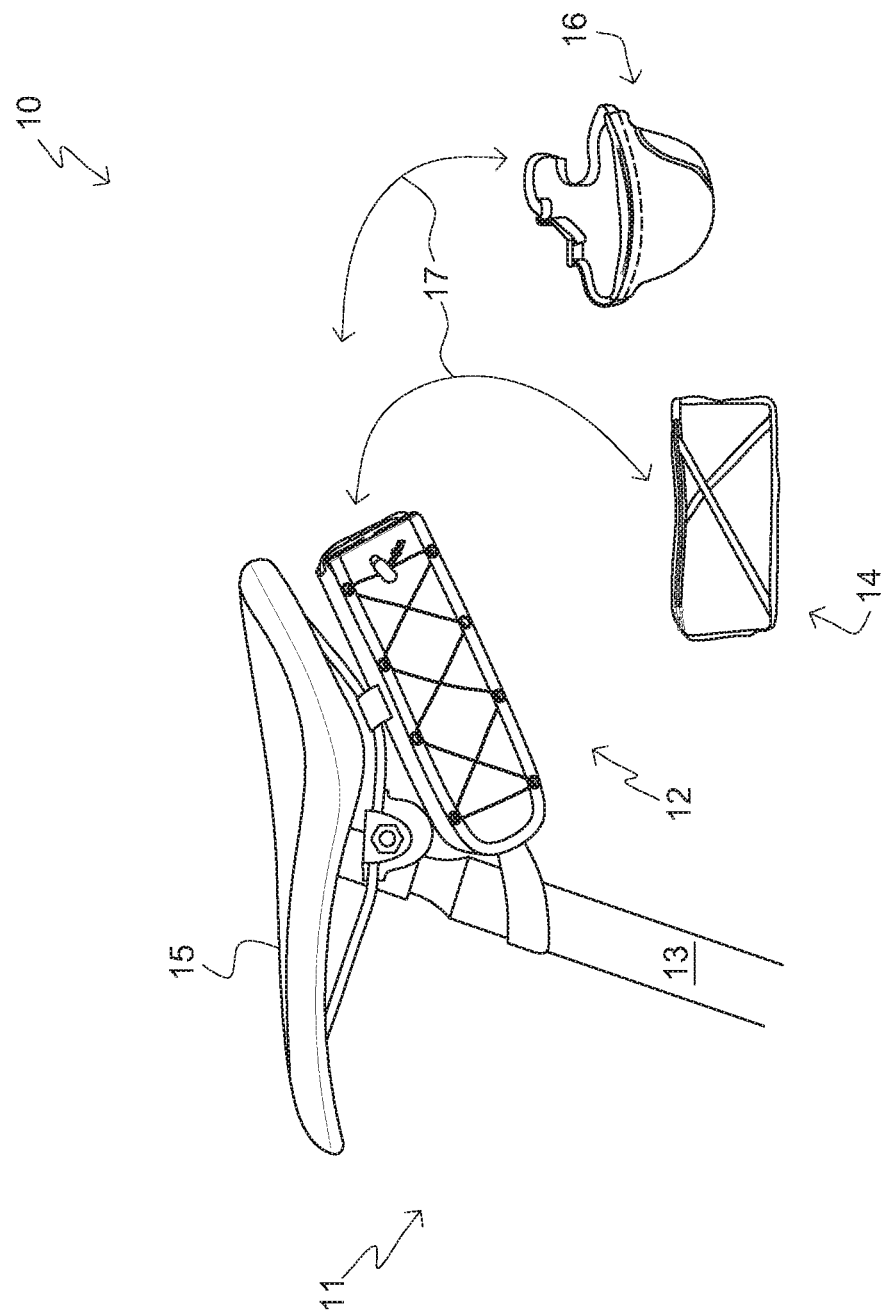
FIG. 1 is a front elevational view of a bike bag kit, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a front elevational view of a bike bag kit 10, according to one embodiment of the invention. There is shown a bike bag kit 10, including a bike bag 12, a tool bag (utility bag) 14, and a fanny pack 16. The tool bag 14 and the fanny pack 16 may be removably coupled to the bike bag 12 so that the tool bag 14 and the fanny pack 16 may be disposed within the bike bag 12. The bike bag 12 is removably coupled to a bike 11. The bike bag 12 may be removably coupled to a seat post 13 of a seat 15 of a bike 11. The tool bag 14 and fanny pack 16 may be moved 17 in and out of the bike bag 12.

The illustrated bike bag 12 includes a bag 12 for removably coupling to a bike 11.

The bike bag 12 may be removably coupled to a bike by fasteners, such as, but not limited to: straps, buckles, hook and loop, snaps, ties, belts, etc. The bike bag 12 may be any container that may be used to contain items. The bike bag 12 may contain a tool bag 14 and/or a fanny pack 16. The bike bag 12 may have a shell that is hard or soft for protecting items contained within. The bike bag 12 may be comprised of a variety of materials, such as, but not limited to: plastic, rubber, metal, and textiles. The bike bag 12 may be comprised of textiles, such as, but not limited to: cotton, polyester, silk, and wool.

The bike bag 12 may be comprised of a water-resistant material. The bike bag 12 may have any size or shape to contain items. The illustrated bike bag includes a U-shaped insert (generally a U-shaped plastic strip having substantially the same width as the bike bag) disposed within the body of the bike bag that biases the bag into the illustrated U-shape even when the bike bag is empty.

As illustrated, the tool bag 14 may be disposed within the bike bag 12. The tool bag 14 may be removably coupled to the bag 12, such as by hook and loop, snaps, etc. The tool bag 14 may contain tools. The tool bag 14 may contain tools used to fix bikes 11 and/or couple a bike bag 12 to a bike 11. For instance, the tool bag may contain tools such as, but not limited to wrenches, screw drivers, ratchets, pliers, etc. The tool bag 14 may be any container that is used to contain tools. The tool bag 14 may be flexible and may conform to fitting within the bike bag 12. Accordingly, the tool bag 14 may be comprised of a variety of materials, such as, but not limited to: plastic, rubber, metal, and textiles. The tool bag 14 may be comprised of textiles, such as, but not limited to: cotton, polyester, silk, and wool. The tool bag 14 may have any size or shape to contain tools.

Additionally, the illustrated fanny pack 16 may be disposed within the bike bag 12. The fanny pack 16 may be removably coupled to the bag 12, such as by hook and loop, snaps, etc. The fanny pack 16 may be used to contain personal items, such as keys, wallets, cellular phones, and so on. The fanny pack 16 may be flexible and may conform to fitting within the bike bag 12. As a result, the fanny pack 16 may be comprised of a variety of materials, such as, but not limited to: plastic, rubber, metal, and textiles. The fanny pack 16 may be comprised of textiles, such as, but not limited to: cotton, polyester, silk, and wool. The fanny pack 16 may have any size or shape to contain personal items and to couple to a person. The tool bag 14 and the fanny pack 16 may be moved 17 in and out of the bike bag 12 separately or together.

In operation, a bike rider employs a bike bag kit 10 to transport various items within a bike bag 12. The rider couples a bike bag 12 to a seat post 13 of a seat 15 of a bike 11. The rider may fasten the bike bag 12 to the seat post 13 by straps, buckles, hook and loop, snaps, ties, belts, etc. The rider packs a tool bag 14 and a fanny pack 16 with items. The rider disposes the tool bag 14 and the fanny pack 16 within the bike bag 12.

The rider transports the tool bag 14 and the fanny pack 16 in the bike bag from one location to another. When the rider needs a tool, the rider accesses the tool bag 14 in the bike bag 12. When the rider requires an item packed in the fanny pack 16, the rider accesses the fanny pack 16 in the bike bag 12. The rider may remove the tool bag 14 and the fanny pack 16 from the bike bag 12 for accessibility. Likewise, the rider may wear the fanny pack 16 for accessibility.

Figure 2:
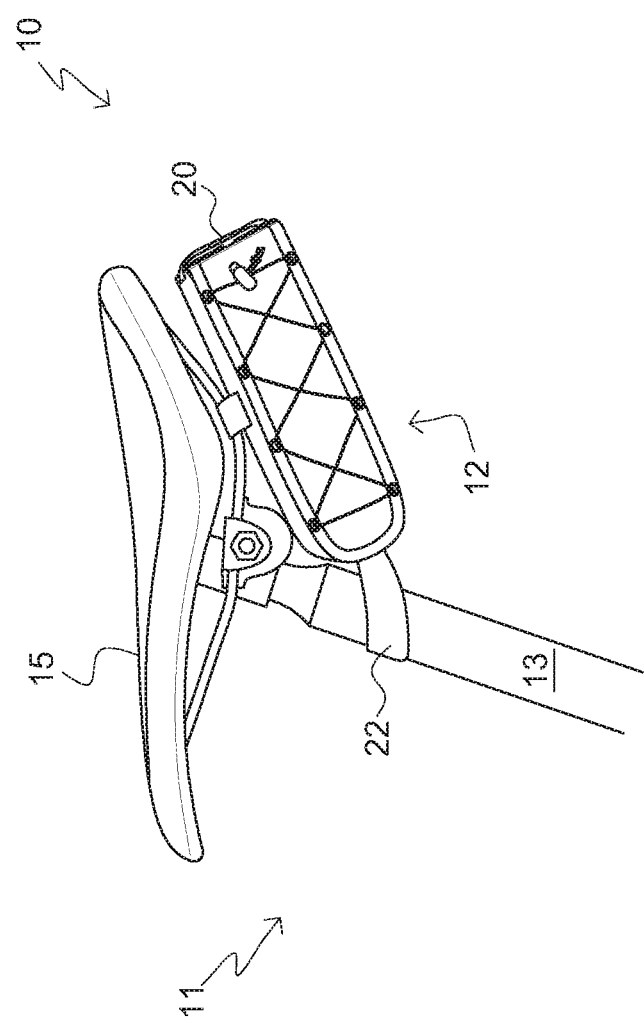
FIG. 2 is a front elevational view of a bike bag kit, according to one embodiment of the invention.

FIG. 2 illustrates a front elevational view of a bike bag kit 10, according to one embodiment of the invention. There is shown a bike bag kit 10, including a bike bag 12 coupled to a seat post 13 of a seat 15 of a bike 11. The bike bag includes a closure 20 coupled to, and disposed along, a rear portion of the bike bag 12. The bike bag 12 is removably coupled to the seat post 13 by a seat post fastener 22. In addition, the bike bag 12 is removably coupled to the seat 15 by a saddle fastener (See FIG. 3 element 24).

The illustrated closure 20 helps the bike bag 12 to remain closed and contain the tool bag 14 and fanny pack 16. The closure 20 may be a strap, tie, belt, cord, etc., that encompasses a rear portion of the bike bag 12. The closure 20 may be cinched, or otherwise shortened in length, to secure items disposed within the bike bag 12 in place. The closure 20 may have a buckle or clamp to close the bike bag 12 and secure items. The closure 20 may be fixedly coupled to a rear portion of the bike bag 12. The closure 20 may be comprised of a number of materials, such as, but not limited to: plastic, elastic, cotton, nylon, metal, hook and loop, etc. In an alternative embodiment, the bike bag may be selectably closable via other closure devices, such as but not limited to a zipper, tie, lock, friction fit, and the like and combinations thereof.

As illustrated, the seat post fastener 22 is disposed along a front portion of the bike bag 12 and removably couples the bike bag 12 to the seat post 13. The seat post fastener 22 may be a strap, tie, belt, cord, etc., that couples the bike bag 12 to the seat post 13. The seat post fastener 22 may be cinched, or otherwise shortened in length, to secure the seat post fastener 22 to the seat post 13. The seat post fastener 22 may have a buckle or clamp for coupling to the seat post 13. Accordingly, the seat post fastener 22 may be comprised of a number of materials, such as, but not limited to: plastic, elastic, cotton, nylon, metal, hook and loop, etc.

The illustrated saddle fastener 24 is disposed along a top portion of the bike bag 12 and removably couples the bike bag 12 to the seat 15. The saddle fastener 24 may be a strap, tie, belt, cord, etc., that couples the bike bag 12 to the seat 15. The saddle fastener 24 may be cinched, or otherwise shortened in length, to secure the saddle fastener 24 to the seat 15. The saddle fastener 24 may have a buckle or clamp for coupling to the seat 15. As a result, the saddle fastener 24 may be comprised of a number of materials, such as, but not limited to: plastic, elastic, cotton, nylon, metal, hook and loop, etc.

Figure 3:
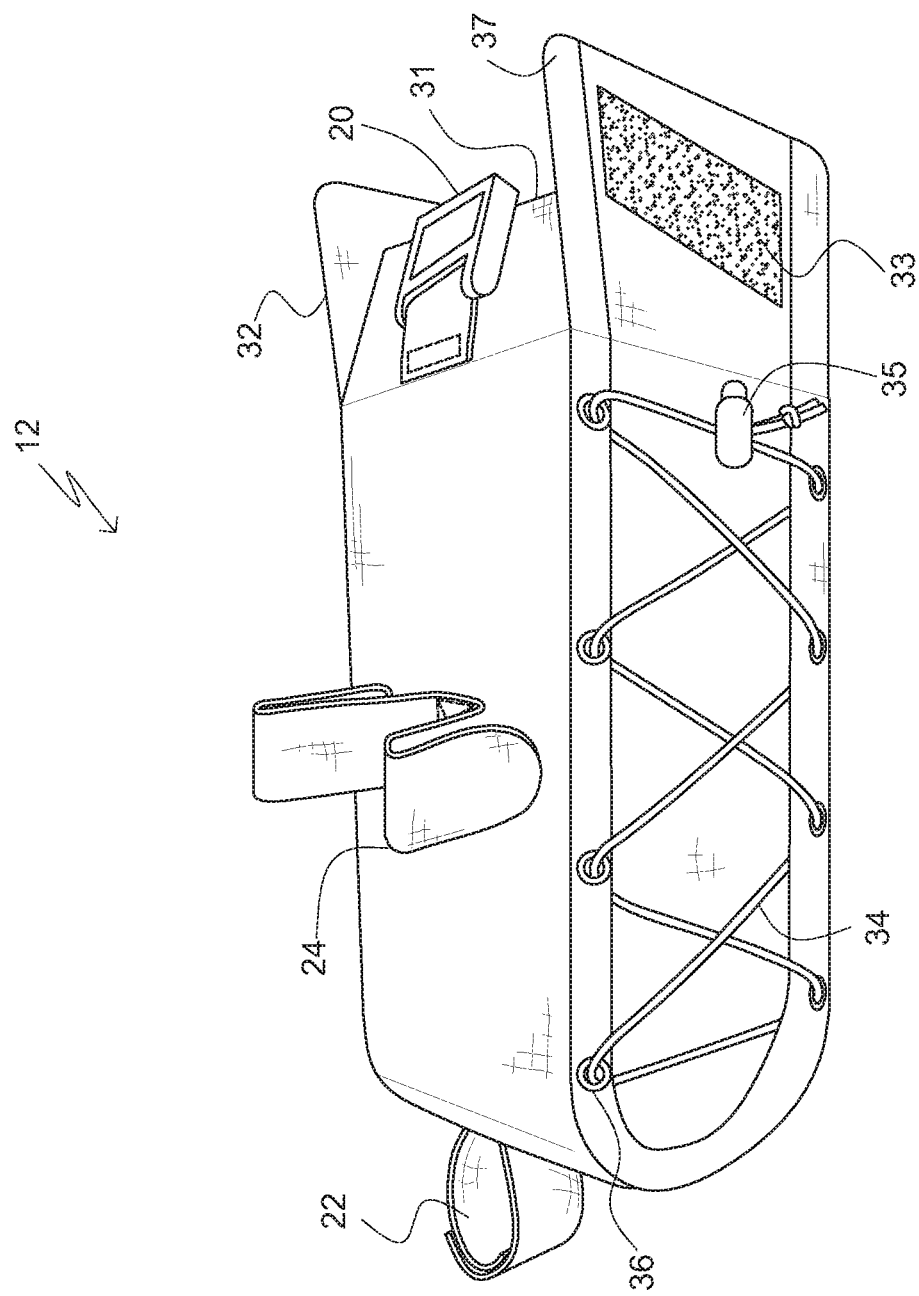
FIG. 3 is a side perspective view of a bike bag of a bike bag kit, according to one embodiment of the invention.

FIG. 3 illustrates a side perspective view of a bike bag 12 of a bike bag kit, according to one embodiment of the invention. As shown, the bike bag kit 10 includes a bike bag 12. The bike bag 12 has an inner flap 31 and an outer flap 32 coupled to a rear portion of the bike bag 12 and extending outwardly therefrom. The bike bag 12 also has coupling device 33 coupled to the rear portion of the bike bag 12. In addition, bike bag 12 includes a cinch cord 34, with a cinch lock 35, disposed through grommets 36 along a side of the bike bag 12. Further, the bike bag 12 has contrast tape 37 disposed along a side of the bike bag 12. The illustrated bike bag includes a coupling structure 20 configured to secure closed the mouth of the bike bag, and a seat post fastener 22 and a saddle fastener 24 to couple the bike bag to a bike (underneath and extending backwards with respect to a seat thereof).

The illustrated inner and outer flaps, 31 and 32 respectively, are coupled to a rear portion of the bike bag 12 and extend outwardly there from. Accordingly, the flaps 31, 32 may be extensions of the bike bag 12. The flaps 31, 32 may fold over one another to seal and/or secure contents of the bike bag 12. As a result, the flaps 31, 32 may be hingedly coupled to the bike bag 12. For instance, in one non-limiting example, the inner flap 31 may fold over and close off the inside of the bike bag 12. The outer flap 32 may then fold over the inner flap 31 to further secure or seal the bag 12. The flaps 31, 32 may be comprised of the same material as the bike bag 12. The flaps 31, 32 may be comprised of a variety of materials, such as, but not limited to: plastic, rubber, metal, and textiles. The flaps 31, 32 may be comprised of textiles, such as, but not limited to: cotton, polyester, silk, and wool. The flaps 31, 32 may be comprised of a water-resistant material. The flaps 31, 32 may have any size or shape to fold and/or seal and/or secure items. Wherein the bike bag is closable by a zipper, there may be a single flap having a U-shaped zipper extending about most of a perimeter of the flap that couples the flap to the mouth of the bike bag. The zipper may be waterproof and/or water-resistant.

As illustrated, the coupling device 33 is disposed along the outer flap 32. The coupling device 33 couples the inner and outer flaps 31, 32 to each other when folded. The coupling device 33 may include any device or material for coupling the flaps 31, 32 together. For example, the coupling device 33 may be: hook and loop, snaps, buttons, and so on.

The illustrated cinch cord 34 is disposed through a plurality of grommets 36 disposed along a side of the bike bag 12. The cinch cord 34 may be cinched or tightened to decrease a volume of the bike bag 12 and thereby secure items stored within the bike bag 12. The cinch cord 34 may be elastic. The cinch cord 34 may be comprised of a variety of materials, such as, but not limited to: nylon, cotton, rayon, polyester, etc. The cinch cord 34 may have any length for cinching. The cinch cord 34 may be a continuous loop, or the cinch cord 34 may be an open loop that it closed, such as by tying.

As illustrated, the grommets 36 are disposed along a side of the bike bag 12 and spaced so that the cinch cord 34 may be threaded therethrough. The grommets 36 have an aperture disposed therethrough so that a cinch cord 34 may be threaded through the grommets 36. Accordingly, the grommets 36 may have any size or shape for threading. The grommets 36 may be disposed along a portion of a side of the bike bag 12 or along an entire length of the bag 12. The grommets 36 may be spaced along the bag 12 to ensure adequate threading and/or tightening of the cinch cord 34. The grommets 36 may be comprised of any material for threading such as, but not limited to: metal, plastic, wood, etc. In addition, the grommets 36 may have any size, shape, or diameter for threading, such as, but not limited to: triangular, circular, square, rectangular, etc.

The illustrated cinch cord 34 may include a cinch cord lock 35 slidably coupled to the cinch cord 34. The cinch cord lock 35 may be operated by compressing the lock 35 and sliding the cinch cord 35 one direction or another through an aperture of the lock 35. For example, the cinch cord 35 may be tightened by compressing the lock 35 and pulling the cinch cord 34 through the cinch cord lock 35 in a first direction. The cinch cord 35 may be loosened by compressing the lock 35 and pulling the cinch cord 34 through the cinch cord lock 35 in a second direction opposite the first direction. The cinch cord lock 35 may be comprised of a variety of materials to cinch the cord 34 and allow the cord to slide therethrough, such as, but not limited to: plastic, metal, rubber, wood, etc.

In addition, the illustrated bike bag 12 has contrast tape 37 disposed along a side of the bike bag 12. The contrast tape 37 may be adhered to the bike bag 12 by an adhesive, or the contrast tape 37 may be a portion of the bike bag 12 that includes reflective material. The contrast tape 37 may further include a material of a contrasting color. When a rider is using the bike bag 12, the contrast tape 37 may serve to alert others to a rider's presence by reflecting light. The contrast tape 37 may be comprised of any substance that reflects light. The contrast tape 37 may include a mirror and/or a mirrored surface. The contrast tape 37 may fluoresce. The contrast tape 37 may have any surface area to reflect light.

Figure 4:
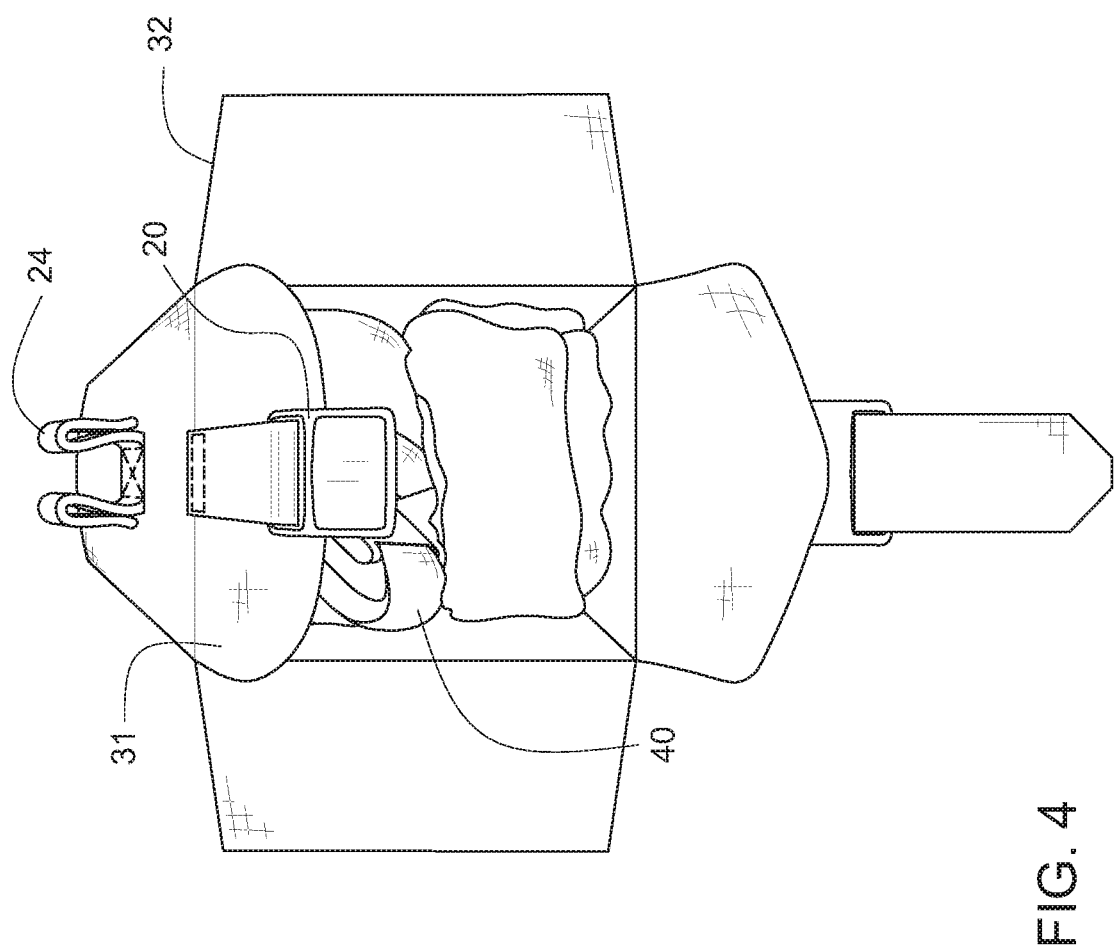
FIG. 4 is a rear perspective view of a bike bag of a bike bag kit, according to one embodiment of the invention.

FIG. 4 illustrates a rear perspective view of a bike bag of a bike bag kit, according to one embodiment of the invention. As shown, the bike bag 12 includes a closure 20 coupled to an inner flap 31 of the bag 12, and a saddle fastener 24 coupled to the bag 12. Also shown, there is a fanny pack strap 40 disposed within an interior of the bag 12. The illustrated embodiment shows a fanny pack disposed within the bike bag together with a tool bag, wherein the fanny pack is disposed over the tool bag, in parallel, as opposed to serial placement (See FIG. 5).

The illustrated closure 20 is coupled to an inner flap 31 of the bag 12 and may be used to close the bag 12 by coupling to a closure disposed on an opposite inner flap 31. For instance, in one non-limiting example, the closure 20 may be a belt with a buckle. Accordingly, the closure 20 may be used to secure the flaps 31, 32 when they are folded inwardly to contain or seal the interior of the bag 12. The closure 20 may include a variety of materials or fasteners for closing the bag 12, such as, but not limited to: snaps, toggles, buttons, hook and loop, ties, straps, etc.

As illustrated, the saddle fastener 24 is coupled to a top portion of the bike bag 12. As a result, the saddle fastener 24 may be used to secure the bike bag 12 to a seat of a bike 11. The saddle fastener 24 may be a strap that removably couples to a seat 15 of a bike 11. The saddle fastener 24 may include a variety of materials for fastening the bike bag 12 to a seat 15, such as, but not limited to: snaps, toggles, buttons, hook and loop, ties, straps, belts, etc.

The illustrated fanny pack strap 40 is shown disposed within the bag 12. The fanny pack strap 40 is coupled to a fanny pack disposed within the bike bag 12.

Accordingly, the bike bag 12 may store, protect, and/or transport the fanny pack for use by a rider. The fanny pack is easily accessed by a rider by pulling on the fanny pack strap 40. The fanny pack strap 40 may be comprised of a variety of materials, such as, but not limited to: cotton, polyester, silk, nylon, rayon, plastic, rubber, and wool. The fanny pack strap 40 may have any length sufficient for grabbing and wearing.

Figure 5:
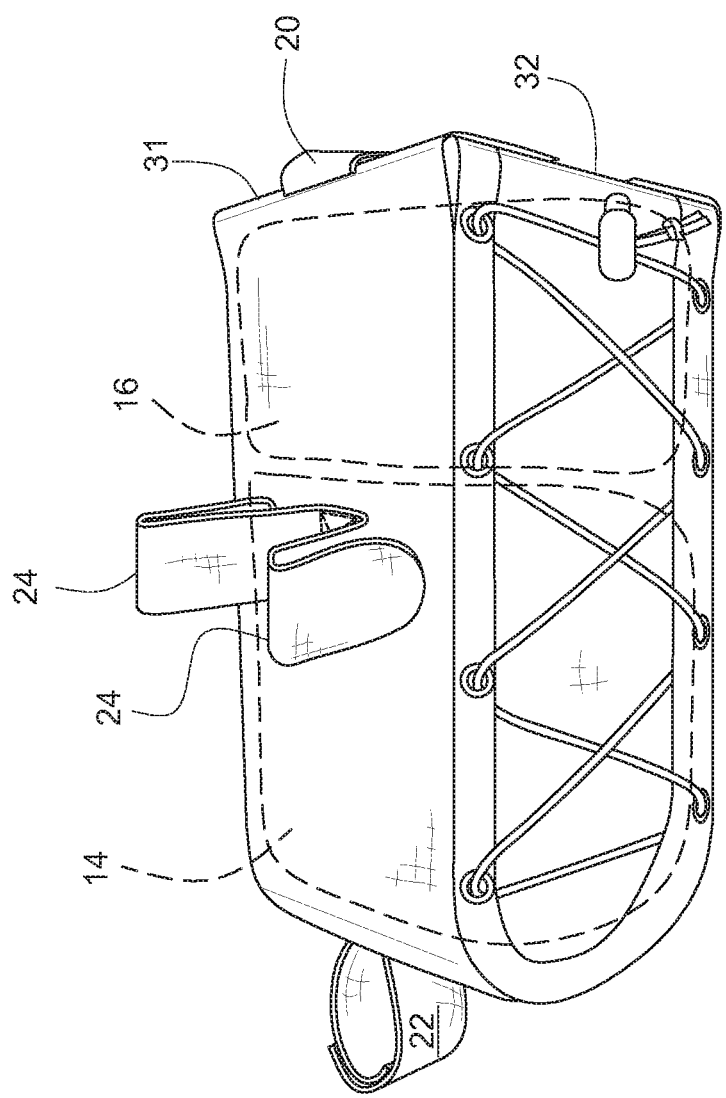
FIG. 5 is a front perspective view of a bike bag of a bike bag kit in a closed position showing a tool bag and a fanny pack, according to one embodiment of the invention.

FIG. 5 illustrates a front perspective view of a bike bag 12 of a bike bag kit 10 in a closed position showing a tool bag 14 and a fanny pack 16, according to one embodiment of the invention. As shown, the tool bag 14 and fanny pack 16 are disposed within the big bag 12. Coupled to the bike bag 12 there is a closure 20, a seat post fastener 22, and a saddle fastener 24. The bike bag 12 also has an outer flap 32.

The illustrated tool bag 14 and fanny pack 16 are disposed within the bike bag 12. The tool bag 14 and fanny pack 16 may be stored within the bike bag 12 for protection, transport, and/or storage. The tool bag 14 and fanny pack 16 may be removed from the bike bag 12 for use by the rider. As a result, the tool bag 14 and fanny pack 16 may have any size, shape, or material for disposing within the bike bag 12.

As illustrated, the closure 20, seat post fastener 22, and saddle fastener 24, are straps that are coupled to the bike bag 12 and extend outwardly therefrom. Accordingly, a rider may use the closure 20, seat post fastener 24, and saddle fastener 24 for securing the bag 12. For instance, the closure 20 may be used to secure the bag to itself, such as by securing flaps 31, 32 of the bag 12. Similarly, the seat post fastener 24 may be used to secure the bag 12 to a seat post 13 of a bike 11. More, the saddle fastener 24 may be used to secure the bag 12 to a bike seat 15. As a result, the closure 20, seat post fastener 22, and saddle fastener 24, may have any length or size for securing the bike bag 12.

Additionally, the closure 20, seat post fastener 22, and saddle fastener 24 may be comprised of any material for fastening, such as, but not limited to: textiles, plastic, metal, rubber, etc.

The illustrated outer flap 32 is coupled to the bike bag 12. As shown, the flap 32 is folded over a rear portion of the bike bag 12. Accordingly, the outer flap 32 may hide, secure, and/or protect contents of the bike bag 12. Hence, the outer flap 32 may have any size or shape for folding, securing, hiding, and/or protecting.

Figure 6:
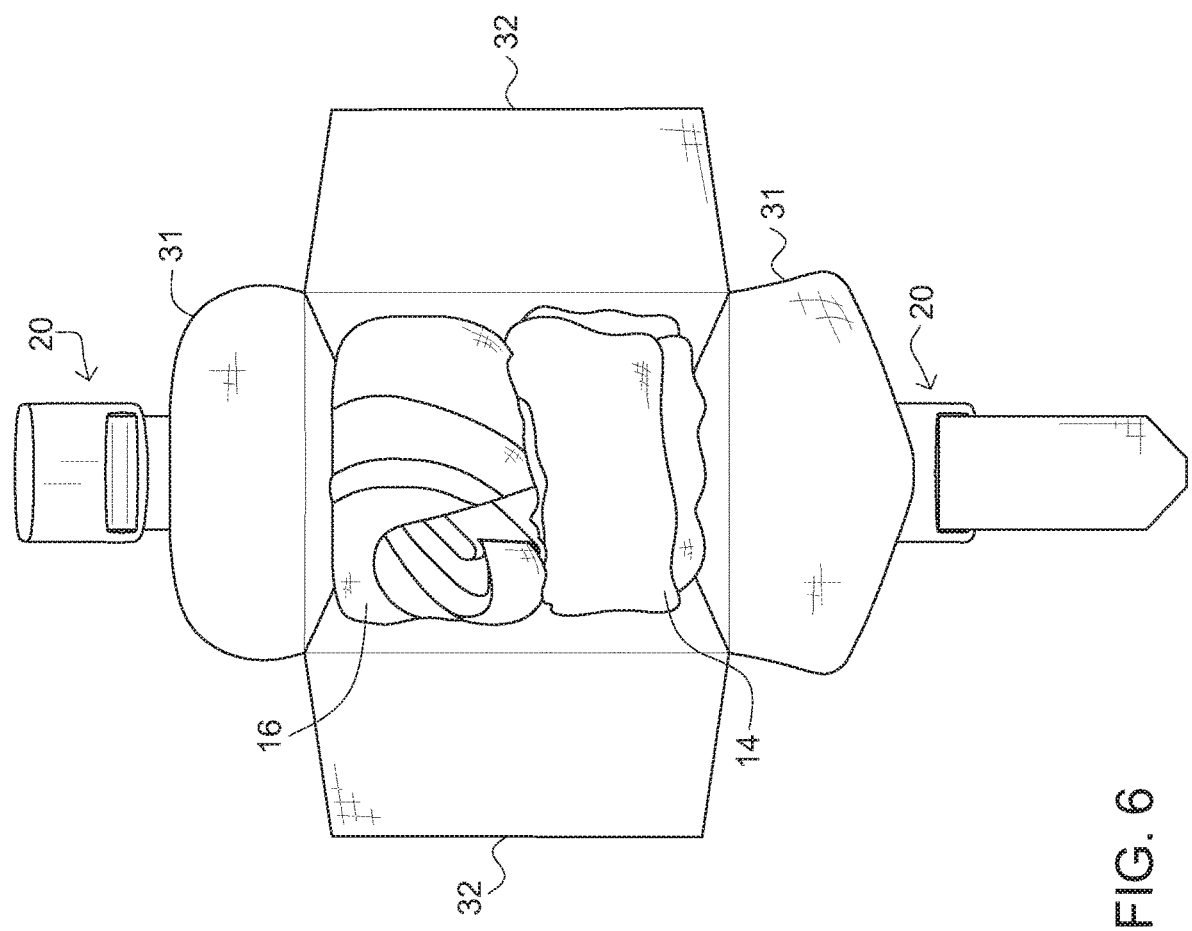
FIG. 6 is a top plan view of a bike bag kit in an open position and showing a bike bag, a tool bag, and a fanny pack, according to one embodiment of the invention.

FIG. 6 illustrates a top plan view of a bike bag kit in an open position and showing a bike bag 12, a tool bag 14, and a fanny pack 16, according to one embodiment of the invention. As shown, a tool bag 14 and a fanny pack 16 are disposed within the bike bag 12. The bike bag also includes inner flaps 31 and outer flaps 32 with a closure 20 coupled to the outer flaps 32.

The illustrated tool bag 14 and fanny pack 16 are disposed within the bike bag 12.

The tool bag 14 and the fanny pack 16 may be disposed within the bike bag 12 for protection, storage, transport, etc. Accordingly, the tool bag 14 and the fanny pack 16 may be removably coupled to the bike bag 12. For example, the tool bag 14 and the fanny pack 16 may be fastened to the bike bag 12 to prevent shifting and/or other movement. More, the tool bag 14 and the fanny pack 16 may be comprised of a flexible material so that a rider may stuff them into the bike bag 12. For instance, the tool bag 14 and the fanny pack 16 may be comprised of a variety of flexible materials, such as, but not limited to: cotton, nylon, rubber, and, polyester. The tool bag 14 and the fanny pack 16 may also be comprised of stiff materials and materials suited for protecting the contents of the tool bag 14 and the fanny pack 16. For example, the tool bag 14 and the fanny pack 16 may be comprised of metal, plastic, foam, batting, and so on. Furthermore, the tool bag 14 and the fanny pack 16 may have any size or shape for fitting within the bike bag 12.

As illustrated, the inner flaps 31 and outer flaps 32 are coupled to the bike bag and extend outwardly therefrom. There is also a closure 20 coupled to the outer flaps 32. As shown, the inner flaps 31 and the outer flaps 32 are in an open position so that the tool bag 14 and the fanny pack 16 may be viewed and accessed by a rider. As a result, the inner flaps 31 and the outer flaps 32 may be hingedly coupled to the bike bag for folding. In addition, the inner flaps 31 and the outer flaps 32 may have any size or shape or be comprised of any material for folding and covering the tool bag 14 and the fanny pack 16.

The illustrated closure 20 is coupled to the outer flaps 32 for closing and sealing contents of the bike bag. As shown, the closure 20 may be a strap or a belt with a buckle. Also, the closure 20 may open and close so that the inner and outer flaps 31, 32 may be opened and closed. The closure 20 may also be comprised of coupling such as, but not limited to: ties, snaps, hook and loop, buttons, etc. The closure may also be comprised of a variety of materials, such as plastic, metal, textiles, rubber, and so on. Accordingly, the rider may close the bag by folding the inner flaps 31 over the tool bag 14 and the fanny pack 16, folding the outer flaps 32 over the inner flaps 31, and securing the outer flaps 32 to each other with the closure 20.

Figure 7:
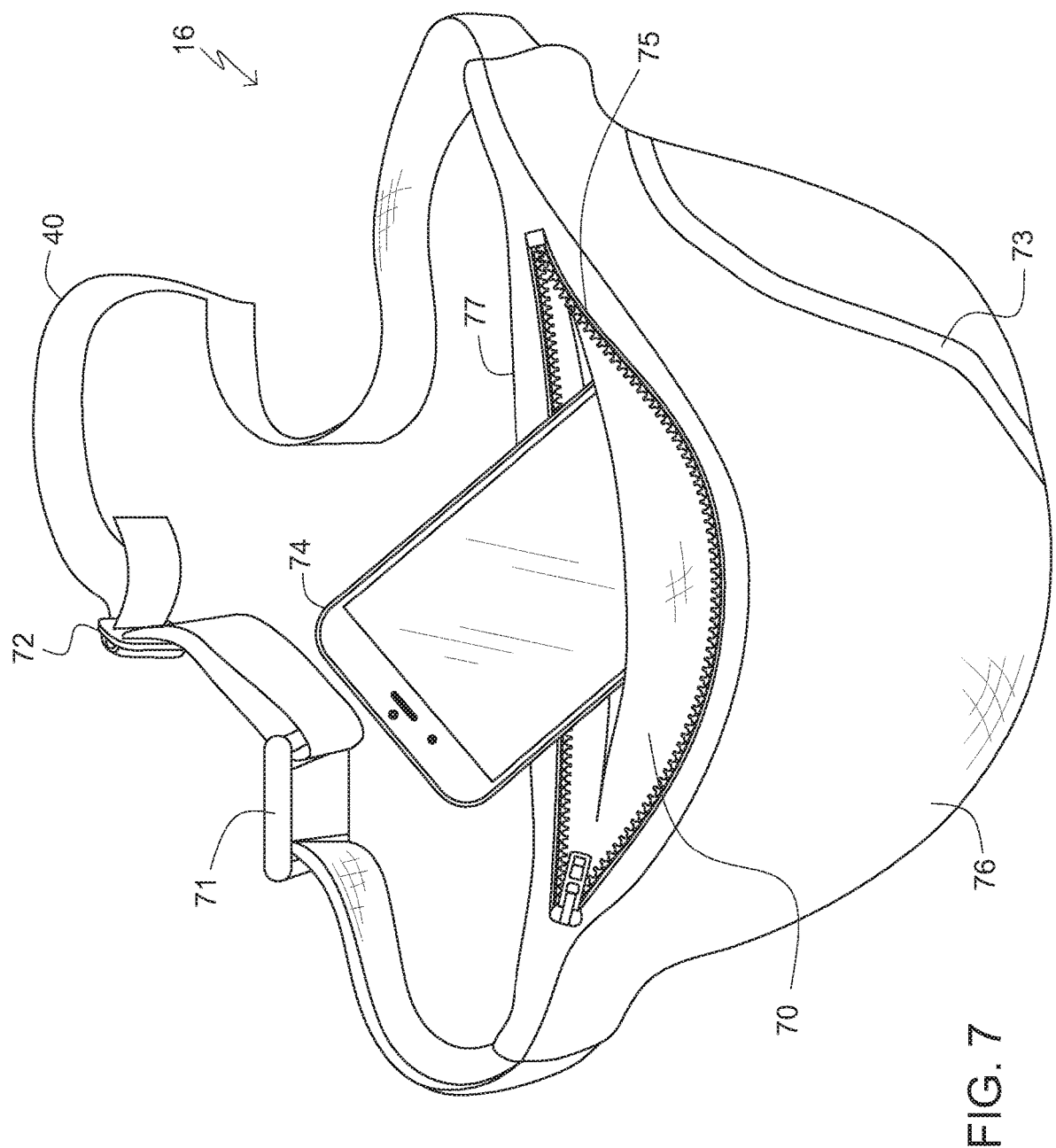
FIG. 7 is a front perspective view of a fanny pack of a bike bag kit, according to one embodiment of the invention.

FIG. 7 illustrates a front perspective view of a fanny pack 16 of a bike bag kit, according to one embodiment of the invention. As shown, there is a fanny pack strap 40 coupled to the fanny pack 16. The fanny pack 16 also includes padded dividers 70, a strap clasp 71, a length adjuster 72, reflective tape 73, an accessory 74, a closure 75, a front wall 76, and a rear wall 77.

The illustrated fanny pack strap 40 is coupled to opposite ends of the fanny pack 16. The fanny pack strap 40 allows a rider to wear, carry, and hold the fanny pack 16.

The fanny pack strap 40 may be comprised of a variety of materials, such as, but not limited to: cotton, polyester, silk, nylon, rayon, plastic, rubber, and wool. The fanny pack strap 40 may have any length sufficient for holding and wearing by a rider.

As illustrated, a strap clasp 71 and a length adjuster 72 are coupled to, and disposed along a length of, the fanny pack strap 40. The strap clasp 71 may be used to open and close the fanny pack strap 40 for wearing by a rider. The strap clasp 71 may be a buckle that opens and closes so that the fanny pack 16 and strap 40 may be placed around a rider's girth. The strap clasp 71 may have any size or shape for clasping the fanny pack 16 around a rider, or for closing the fanny pack strap 40. The strap clasp 71 may be comprised of a variety of materials, such as, but not limited to: plastic, rubber, metal, and wood.

The illustrated length adjuster 72 may be used be a rider to adjust a length of the fanny pack strap 40. The length adjuster 72 may include an aperture with the fanny pack strap disposed therebetween, and may be be slidably coupled to the fanny pack strap 40, so that the fanny pack strap 40 may be pulled in one direction for decreasing a length of the strap 40 for tightening, and pulled in another direction for increasing a length of the strap 40 for loosening. The length adjuster 72 may have any size or shape for sliding and adjusting the strap 40. The length adjuster 72 may include teeth for gripping and holding the strap 40 in place. The length adjuster 72 may be comprised of a variety of materials, such as, but not limited to: plastic, rubber, metal, and wood.

Further illustrated, the fanny pack 16 includes reflective tape 73 disposed along an outside of the fanny pack 16. The reflective tape 73 may be adhered to the fanny pack 16 by an adhesive, or the reflective tape 73 may be a portion of the fanny pack 16 that includes reflective material. When a rider is using the fanny pack 16, the reflective tape 73 may serve to alert others to a rider's presence by reflecting light. The reflective tape 73 may be comprised of any substance that reflects light. The reflective tape 73 may include a mirror. The reflective tape 73 may fluoresce. The reflective tape 73 may have any surface area to reflect light.

As shown, the fanny pack 16 includes an accessory 74. The accessory 74 may be stored within the fanny pack 16 for transport and/or protection. The accessory 74 may be a cellular phone.

The illustrated fanny pack 16 also includes a closure 75. The closure 75 may be used to close the fanny pack 16. As illustrated, the closure 75 may be a zipper. The closure 75 may be any type of closure, such as, but not limited to: snaps, hook and loop, ties, buckles, buttons, etc. The closure 75 may be comprised of a variety of materials, such as, but not limited to: metal, plastic, wood, and textiles. The closure 75 may have any length for closing the fanny pack 16.

Also illustrated, the fanny pack 16 includes a front wall 76 and a rear wall 77 coupled to the front wall 76. The front and rear walls 76, 77 may be coupled to the fanny pack strap 40. The front and rear walls 76, 77 allow the fanny pack 16 to store or contain an accessory 74. Accordingly, the walls 76, 77 may have any shape or size to contain and accessory 74. The front and rear walls 76, 77 may be comprised of a variety of materials, such as, but not limited to: rayon, nylon, polyester, cotton, silk, and so on. The front and rear walls 76, 77 may be comprised of a water-resistant material.

Figure 8:
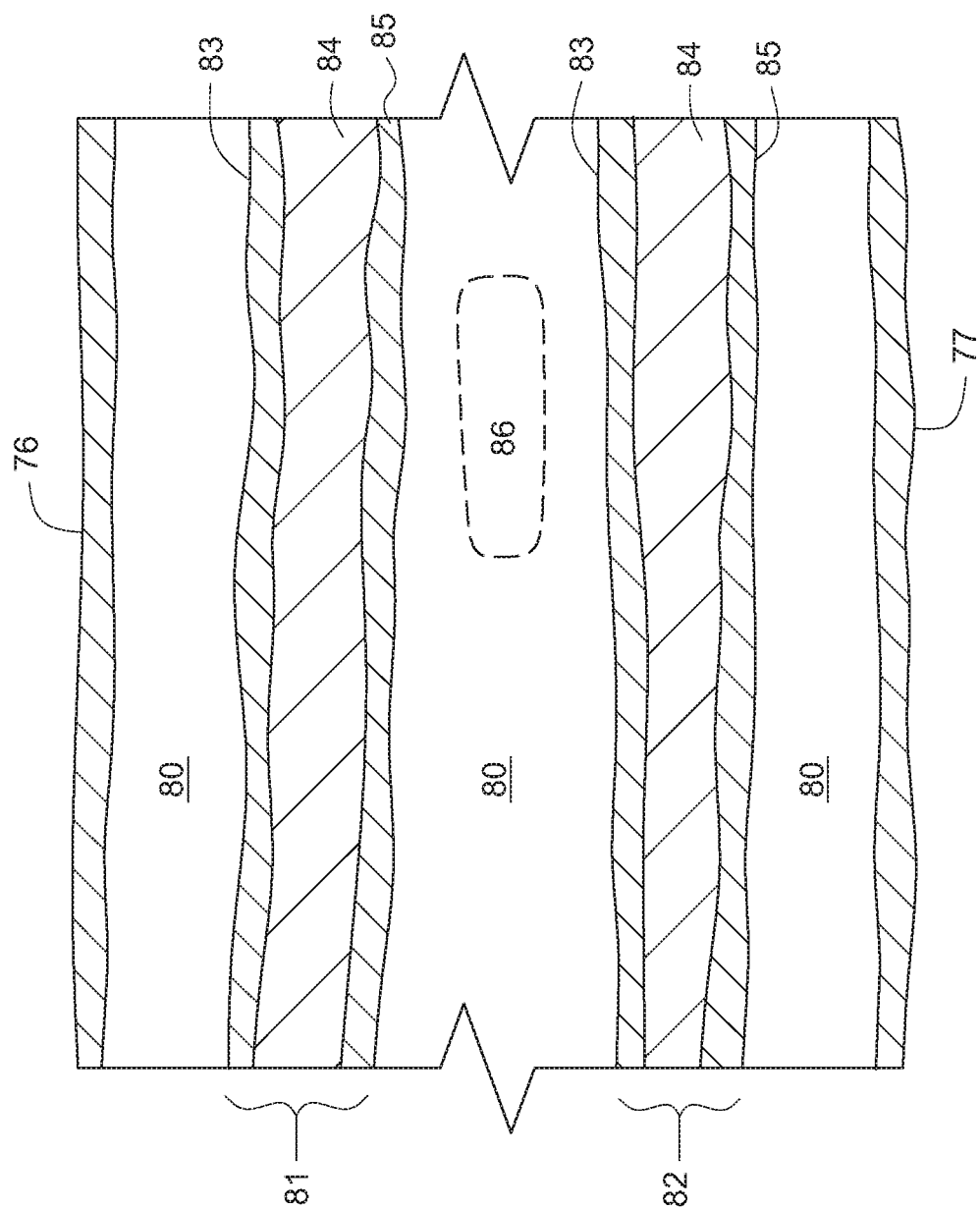
FIG. 8 is a top sectional view of a fanny pack of a bike bag kit; according to one embodiment of the invention.

FIG. 8 illustrates a top sectional view of a fanny pack of a bike bag kit, according to one embodiment of the invention. As shown, the fanny pack has a plurality of voids 80 disposed between the front wall 76 and a first padded wall 81, the first padded wall 81 and a second padded wall 82, and the second padded wall 82 and the rear wall 77. The padded walls 81, 82 have a first layer 83 with padding 84 disposed between the first layer 83 and a second layer 85. There is also an item 86 disposed within a void 80.

The illustrated first padded wall 81 and second padded wall 82 are disposed within the fanny pack. The padded walls 81, 82 may be fixedly coupled to the fanny pack 16. The padded walls 81, 82, may include padding 84, such as batting, foam, etc., for padding and cushioning the fanny pack. For instance, the padded walls 81, 82 may protect and cushion the accessory or item 86. The padded walls 81, 82 may have any shape, size, height, length, width, etc. for padding the fanny pack. Each wall 81, 82 may be at least twice as thick as each of the front and rear walls 76, 77 of the fanny pack.

As illustrated, each padded wall 81, 82 is comprised of a first layer 83 and a second layer 85 with padding 84 disposed therebetween. The padding 84 may be batting, foam, gel, beads, etc. The padding 84 may have any thickness, material, consistency, etc. to provide cushioning.

Figure 9:
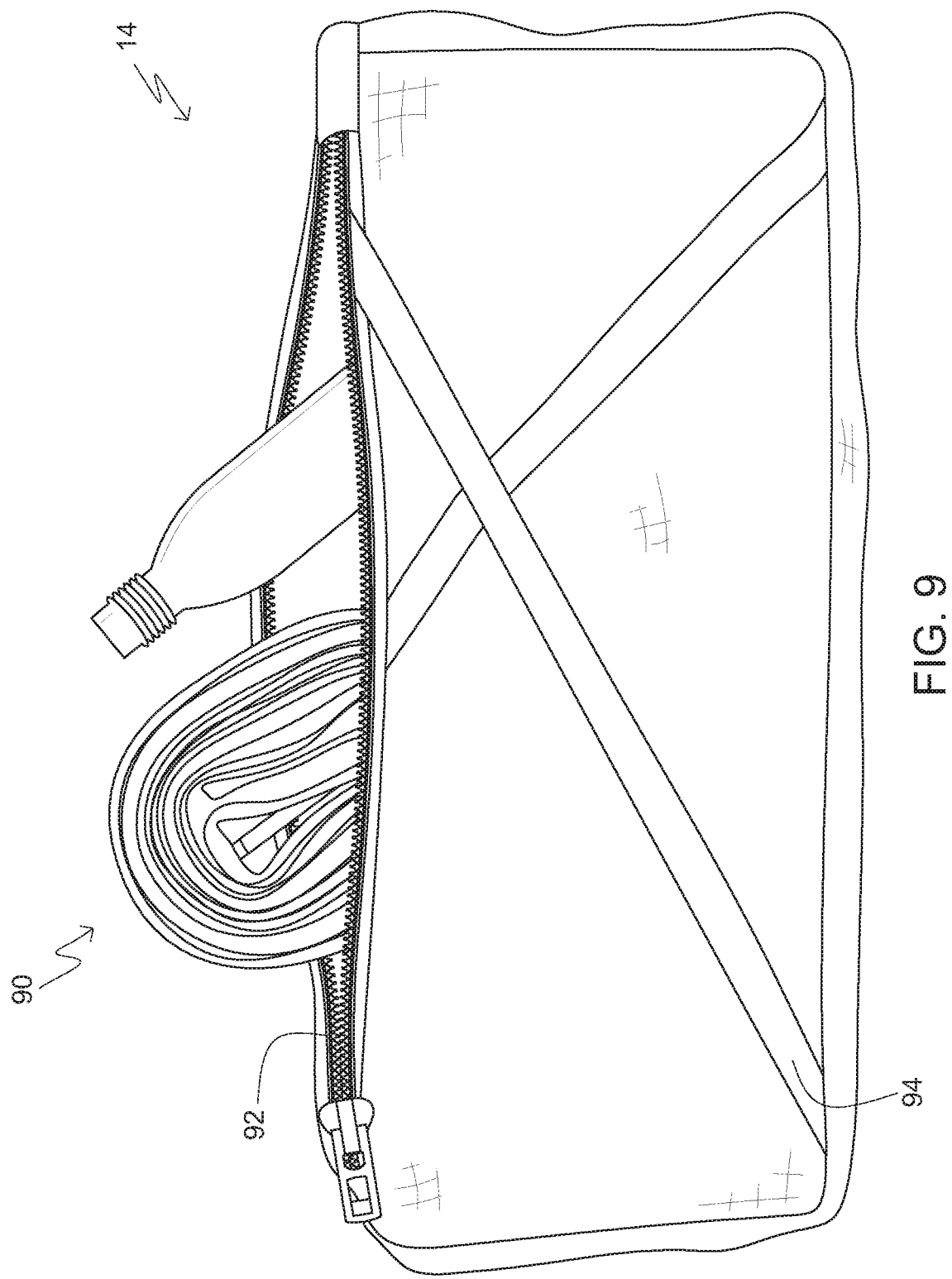
FIG. 9 is a front perspective view of a tool bag of a bike bag kit, according to one embodiment of the invention.

The illustrated first and second layer 83, 85 may provide support. The first and second layer 83, 85 may also contain the padding 84. The layers 83, 85 may have any thickness, material, size, shape, etc. to provide support and/or contain the padding 84. FIG. 9 illustrates a front perspective view of a tool bag 14 of a bike bag kit, according to one embodiment of the invention. As shown, the illustrated tool bag 14 has tools 90 disposed within the tool bag 14. The tool bag 14 also has a tool bag closure 92 and reflective tape 94.

The illustrated tool bag 14 includes tools 90. The tools 90 may be disposed within the tool bag 14. The tool bag 14 may contain or store the tools 90 for use by a rider. The tools 90 may be a variety of tools 90, such as: pliers, a wrench, a hammer, a screwdriver, a utility knife, a flashlight, a ratchet, a snack bag, patches, glue, scrapers, cleaner, or a chain tool. In one non-limiting embodiment, the tools 90 may be a wrench, a spare tire, a flat repair kit, and a pressurized gas cartridge.

Also, the illustrated tool bag 14 includes reflective tape 94. As shown, the reflective tape 94 is disposed along an outside of the tool bag 14. The reflective tape 94 may be adhered to the tool bag 14 by an adhesive, or the reflective tape 94 may be a portion of the tool bag 14 that includes reflective material. When a rider is using the tool bag 14, the reflective tape 94 may serve to alert others to a rider's presence by reflecting light. The reflective tape 94 may be comprised of any substance that reflects light. The reflective tape 94 may include a mirror. The reflective tape 94 may fluoresce. The reflective tape 94 may have any surface area to reflect light.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, it is understood that the bike bag kit 10 may be sized to fit under larger and smaller bikes, such as children's bikes. Also, the bike bag kit 10 may include bright colors in addition to, or instead of, reflective tape 73, 94. More, the bike bag 12 may not have a cinch mechanism 34,

35. Further, the fanny pack 16 may not have a fanny pack strap 40, but may have no strap, or may have a strap such as a wrist strap.

Additionally, although the figures illustrate a tool bag 14 and a fanny pack 16 disposed within the bike bag 12, it is understood that any type of bag or container may be stored within the bag 12. Similarly, it is understood that a rider may choose not to store additional bags or containers within the bike bag 12. For instance, a rider may choose not to store the tool bag 14 and/or the fanny pack 16 within the bike bag 12 at all.

It is also envisioned that the bike bag 12 may contain an insert for support. For instance, the insert may be removably coupled to the bike bag 12. The insert may be U-shaped and/or plastic for support. The insert may assist with integrity of the bag 12 and may hold the bag 12 open. Accordingly, the insert may extend along a top, bottom, back, front, and/or side of the bike bag 12. Likewise, the tool bag 14 and/or the fanny pack 16 may also include an insert for support of the bags 14, 16.

It is expected that there could be numerous variations of the design of this invention. An example is that the bike bag 12 may be substantially rectangular, square, or oblong. Similarly, the bike bag 12 may be smaller or larger than the bike 11 seat 15. Finally, it is envisioned that the components of the device may be constructed of a variety of materials, such as: metal, glass, wood, textiles, plastic, rubber, elastic, etc. The materials may be water-resistant or waterproof. The materials may be durable. The materials may be reflective.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A bike bag kit, comprising:
   a. a bike bag selectably coupleable to a bike under a bike seat, the bike bag including a selectably closable mouth functionally coupled to a storage cavity, wherein the selectably closable mouth includes a water-resistant zipper and the storage cavity includes a U-shaped insert that biases the storage cavity open against a cinch mechanism disposed on an exterior side of the bike bag, the cinch mechanism including a cinch cord threaded through a plurality of grommets of the bike bag and a cinch lock that secures the cinch cord, the cinch mechanism applying a bias opposite to that of the U-shaped insert; and
   b. a fanny pack disposed within the bike bag and having unpadded front and rear panels, the fanny pack shaped and sized to fit through the mouth and fully within the storage cavity of the bike bag, the fanny pack including:
      i. a padded pocket disposed therein, having a first padded wall and a second padded wall, each being at least twice as thick as each of the front and rear panels of the fanny pack.

2. The kit of claim 1, further including a utility bag including one or more tools, the utility bag shaped and sized to fit through the mouth and fully within the storage cavity of the bike bag together with the fanny pack.

3. The kit of claim 2, wherein the utility bag includes a wrench, a spare tire, a flat repair kit, and a pressurized gas cartridge.

4. The kit of claim 2, wherein the utility bag, the bike bag, and the fanny pack each include reflective material disposed on the outside thereof.

5. The kit of claim 2, wherein each of the utility bag, the bike bag, and the fanny pack include water-resistant closure devices.

6. A bike bag kit, comprising:
   a. a bike bag selectably coupleable to a bike under a bike seat at a seat post and under-saddle thereof, the bike bag including a cinch mechanism having a cinch cord disposed through grommets along a side of the bike bag and a cinch lock coupled to the cinch cord, the cinch mechanism disposed along a side thereof that cinches against bias of a U-shaped insert within the bike bag that biases a storage cavity of the bike bag open when the storage cavity of the bike bag is empty and a selectably closable mouth functionally coupled to the storage cavity, wherein the selectably closable mouth includes a water-resistant zipper;
   b. a fanny pack having unpadded front and rear exterior panels, the fanny pack shaped and sized to fit through the mouth and fully within the storage cavity of the bike bag, the fanny pack forming a padded pocket framed by two adjacent padded interior walls; and
   c. a utility bag including one or more tools, the utility bag shaped and sized to fit through the mouth and fully within the storage cavity of the bike bag together with the fanny pack.

7. The bike bag kit of claim 6, wherein the two adjacent padded walls are the front and rear panels of the fanny pack.

8. The bike bag kit of claim 6, wherein the two adjacent panels are not both the front and rear panels of the fanny pack.

9. The bike bag kit of claim 6, wherein the two adjacent panels are not either of the front or rear panels of the fanny pack but are disposed between the front and rear panels of the fanny pack.

10. A bike bag kit, comprising:
    a. a bike bag selectably coupleable to a bike under a bike seat at a seat post and under-saddle thereof, the bike bag including a selectably closable, and water-resistant when closed, mouth having a water-proof zipper, the mouth functionally coupled to a storage cavity biased open by a U-shaped insert disposed therein the U-shaped insert opposed by a cinch mechanism coupled about an exterior side of the bike bag;
    b. a carry bag disposed within the storage cavity of the bike bag and having unpadded front and rear panels, the carry bag shaped and sized to fit through the mouth and fully within the storage cavity of the bike bag, the carry bag forming a padded pocket framed by two adjacent padded divider walls; and
    c. a utility bag disposed within the storage cavity of the bike bag and including one or more tools related to bike repair, the utility bag shaped and sized to fit through the mouth and fully within the storage cavity of the bike bag together with the carry bag.

11. The kit of claim 10, wherein the carry bag has a waist strap.

12. The kit of claim 11, wherein the utility bag is disposed within the bike bag further from the mouth of the bike bag than the carry bag.

\* \* \* \* \*